Feb. 28, 1928. 1,660,347
H. S. NEIMAN
CONTAINER
Filed Aug. 1, 1925 3 Sheets-Sheet 2
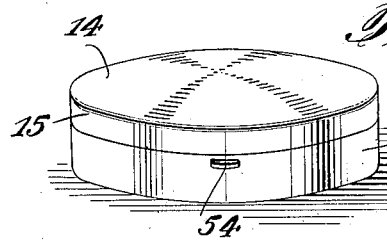
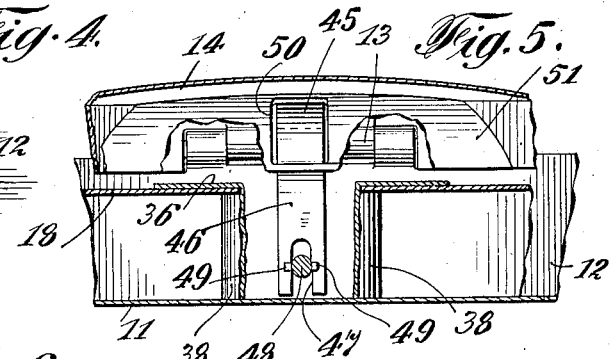
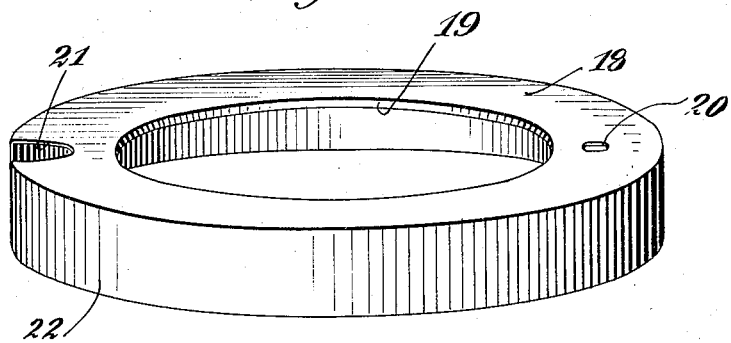
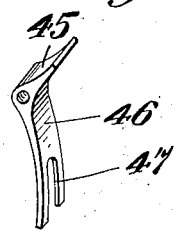
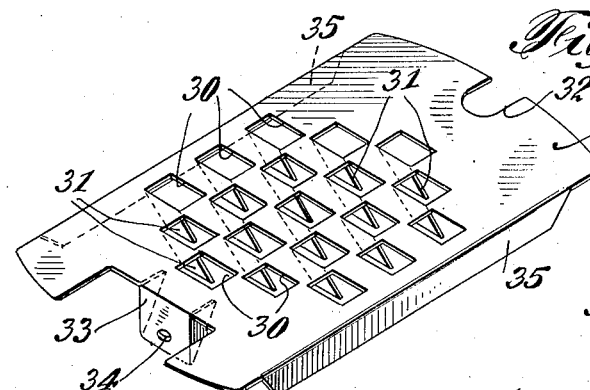
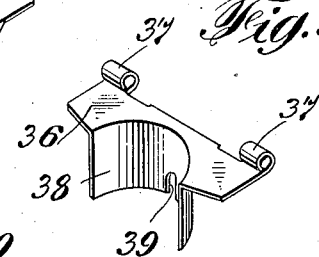
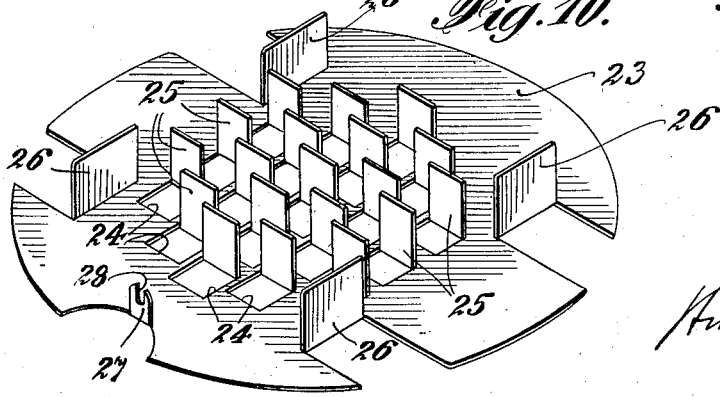
INVENTOR Feb. 28, 1928.
H. S. NEIMAN
CONTAINER
Filed Aug. 1, 1925  3 Sheets-Sheet 3
1,660,347
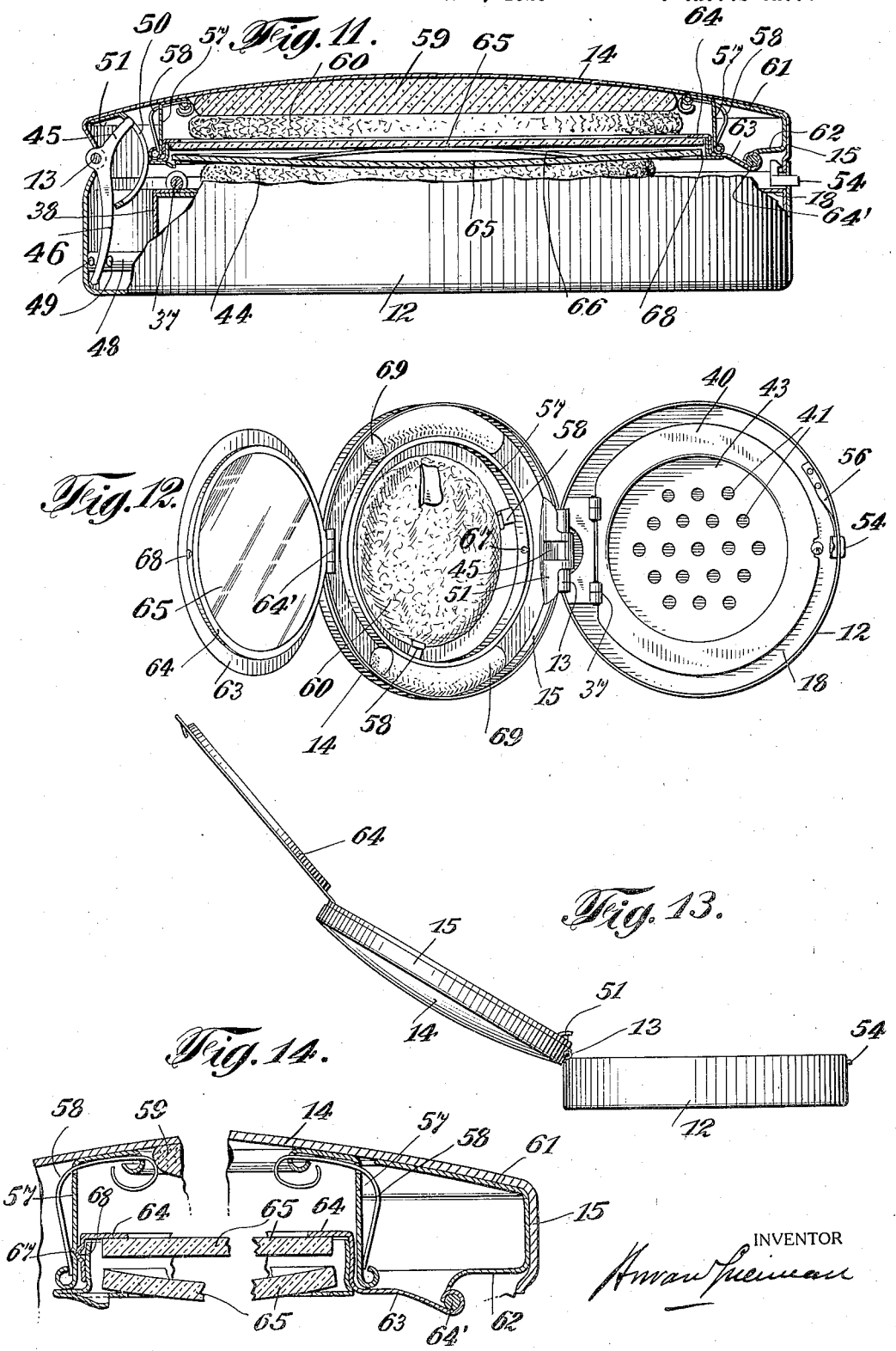

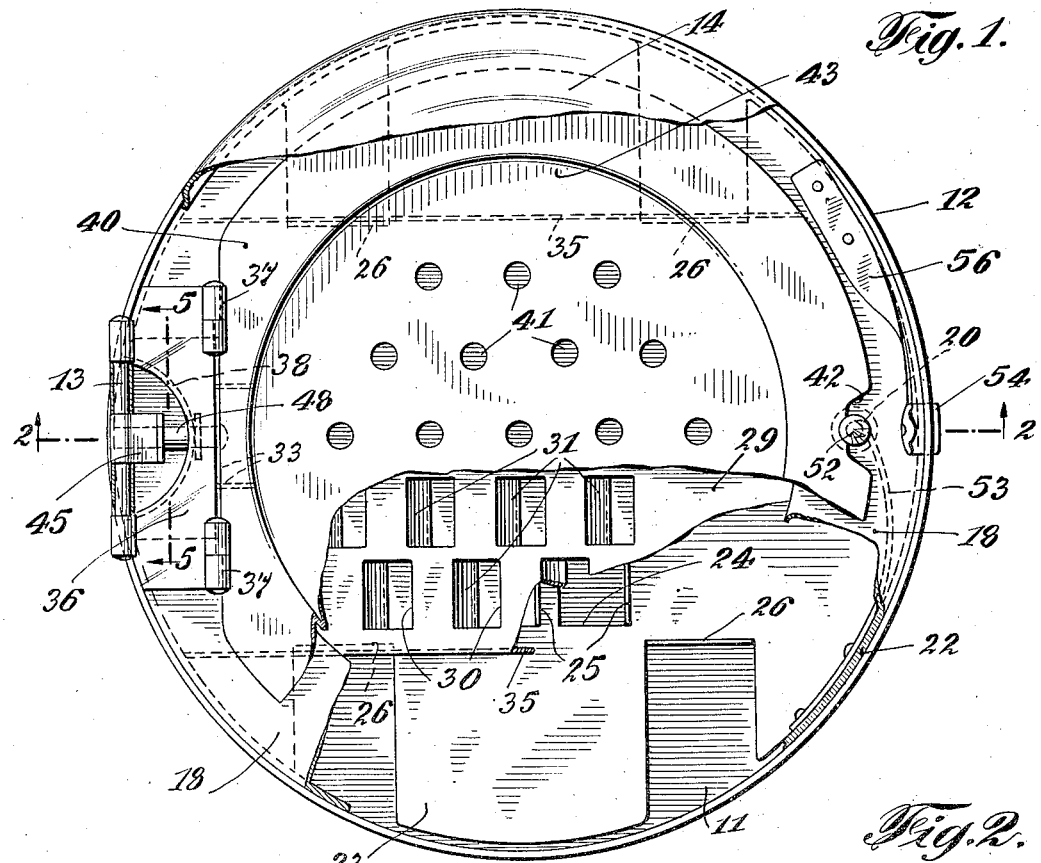
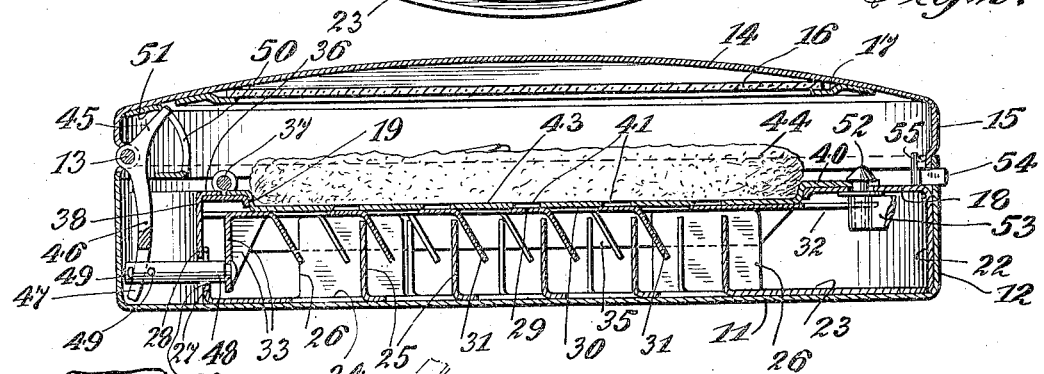
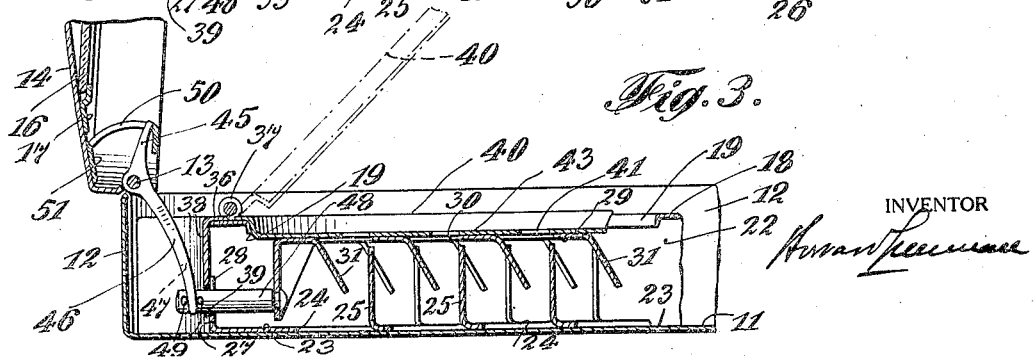

Patented Feb. 28, 1928.

1,660,347

UNITED STATES PATENT OFFICE.

HOWARD S. NEIMAN, OF BROOKLYN, NEW YORK.

CONTAINER.

Application filed August 1, 1925. Serial No. 47,538.

My invention relates to containers and refers particularly to powder containers.

The use of face, and similar, powders in loose form has not been generally adopted because of the annoyance and inconvenience incident to the undesirable sifting of excess powder from the powder receptacle as well as to the liability of the powder puff to become over-loaded with powder, resulting in the dusting off of a quantity of the attached powder.

These conditions have resulted in an extended use of powder compacts with which these objectionable features are not present.

The advantages of loose powder are generally recognized, as they are in a much finer form of physical condition than are the compacts and are free from extraneous substances and binders, all of which are necessary in compact production.

The device of my invention overcomes the objectionable features of the known powder receptacles and presents a means whereby the powder is completely retained within the receptacle during non-use and in which the opening of the device automatically ejects a practically definite amount of powder directly upon the powder puff.

My device, therefore, eliminates the annoyance incident to the accidental emission of powders and to the emission of too great an amount of powder for practically complete application to the face.

In the accompanying drawings illustrating one form of the device of my invention, similar parts are designated by similar numerals.

Figure 1 is a top plan view of one form of a device of my invention with the cover removed and parts broken away.

Figure 2 is a central cross-section of the device of Figure 1 in closed position taken through the line 2—2 of Figure 1.

Figure 3 is a broken central vertical cross-section of Figure 2 in open position, the dot-and-dash line indicating a position of the device for purposes of filling.

Figure 4 is a perspective view of the device in closed position.

Figure 5 is a cross-section through the line 5—5 of Figure 1.

Figure 6 is a perspective view of the supporting member.

Figure 7 is a perspective view of the bell crank.

Figure 8 is a perspective view of the closure plate.

Figure 9 is a perspective view of the powder retaining member.

Figure 10 is a perspective view of the baffle plate member.

Figure 11 is a vertical cross-section of a modified form of my device in closed position adapted to receive and retain a powder puff and mirrors.

Figure 12 is a top plan view of the device of Figure 11 in open position.

Figure 13 is a side view of Figure 12.

Figure 14 is an enlarged broken section of the compact and mirror retaining members.

The particular form of the device of my invention illustrated in Figures 1 to 10 inclusive comprises a powder container having a bottom 11 and an upturned annular side flange 12. Hingedly attached to the flange 12 by means of the hinge 13, is a cover comprised of the top 14 and the downwardly extended annular side flange 15. A mirror 16 is maintained within the cover by means of the bezel 17.

Frictionally retained within the container is a supporting member comprising the upper face 18 having openings 19 and 20 and a recess 21 and the downwardly extended side flange 22.

Within the container and resting upon the bottom 11 thereof, is a baffle member comprising the bottom 23 having a plurality of openings 24, 24, 24, a plurality of upturned baffles 25, 25, 25, the four upturned guide members 26, 26, 26, 26, and an upturned lip 27 having an opening 28 therein. The guides 26, 26, 26, 26 extend slightly above the baffles 25, 25.

The openings 24, 24 are not essential to the operation of the device, but are caused by stamping out and upturning the baffles 25, 25.

Positioned upon the guides 26, 26, 26, 26 and slidably movable thereon is a closure plate 29 having a plurality of openings 30, 30, a plurality of angularly positioned powder-moving plates 31, 31, a recess 32, a downturned flange 33 having an opening 34 therein, and two opposite down-turned side flanges 35, 35. The flanges 35, 35 abut upon the outer faces of the guides 26, 26, 26, 26, allowing of a movement of the closure plate in one direction but preventing its opposite movement.

Within the recess 21 of the supporting member, is positioned a powder retainer comprising the top plate 36 having the hinge members 37, 37 and the downwardly extended annular flange 38 having a recess 39 therein.

Hingedly attached at 37, 37 is a perforated sifting member 40, having a plurality of openings 41, 41 and a recess 42. The member 40 is a centrally positioned depressed portion 43, to receive a powder puff 44, and to retain the ejected powder, and forming a tight closure.

Pivotally carried by the hinge 13 is a crank arm having a short arm 45 and a long arm 46, the arm 46 having an elongated recess 47 therein.

An arm, or rod, 48 is fixedly attached to the flange 33 of the closure plate 29, and passed through the recess 28 of the flange 27 of the baffle plate and through the recess 39 of the flange 38 of the retainer. The rod 48 also passes through the recess 47 of the crank arm, the latter being retained in position by means of the extended pins 49, 49 of the rod 48.

The short arm 45 of the bell crank is movable within an opening 50 of the member 51 carried by the cover top 14.

A button 52 carried by the spring 53 attached to the inner face of the flange 22 tends naturally to lock the sifter member in closed position.

A push button 54 having the hook catch 55 and carried by the spring 56 attach to the inner face of the member 18 tends to lock the cover in closed position, the hook 55 engaging within an indent within the inner face of the flange 15 of the cover.

The operation of the device is as follows:—

In order to introduce the powder, the cover is raised and the perforated sifting member 40 is raised, thus exposing the interior of the powder receptacle. When the powder is introduced, the powder puff 44 is placed in position and the sifting member 40 and the cover are closed. When in this position, the openings in the sifting member 40 and the openings in the closure plate 29 are in non-registered position with respect to each other and no powder can escape. When the cover is raised, no movement is imparted to the powder ejecting mechanism until the lower portion of the member 51 abuts upon the arm 45 of the crank arm, the further movement of the cover then moving the closure plate 29 until its openings and the openings of the sifting member 40 register. During this movement the powder-moving plates 31, 31 carry powder forwardly and upwardly forcing some of it through the registered openings and upon the powder puff 44. If additional powder is desired, the cover is closed and re-opened, the above mentioned powder ejection process thus being repeated.

It is to be noted that the entire receptacle is connected by spacings, so that powder has free access therethrough and that additional powder will find its way in the path of the plates 31, 31 between operations.

The modified form of the device of my invention shown in Figures 11 to 14 inclusive is designed to carry a powder compact in addition to the loose powder. In order to accomplish this, the mechanism of the first described device is changed to allow the cover to be opened to a wider angle. In order to accomplish this, the member 51 carried by the cover 14 extends down further into the space between the bottom flange 12 and the guard 38, thus allowing a longer opening 50, resulting in a greater movement of the cover before movement is given to the member 48.

Carried by the interior face of the cover 14 is an annular flange 57, having a plurality of openings through which extend a plurality of spring clips 58, 58 carried by the flange 57. These spring clips 58, 58 serve as means for retaining a powder compact 59, upon which is placed a powder puff 60.

Fixedly attached to the inner face of the cover opposite the hinge 13, is a plate 61, to the outward extension 62 of which an annular mirror carrying member 63 is hinged at 64'. The member 63 comprises two spaced annular rings 64, 64 between which, are placed two outwardly exposed mirrors 65, 65 maintained in place by means of the spring 66, the lower of which mirrors is convex while the upper one is plane.

The mirror carrying member is retained in closed position by means of the spring catch elements 67, 68.

Within the space between the cover flange 15 and the annular flange 57, lip-sticks, or eye-brow pencils, 69, 69 may be placed and held in place frictionally or by any other suitable means.

The operation of this modified form is similar to that described above.

It is evident that the openings for the escape of the powder may be in alignment instead of staggered, as shown, and that the powder moving plates 31, 31 may be extended to operate upon a plurality of openings instead of upon a single opening as shown.

It is further evident that the several parts of my device may be so constructed that during the opening of the cover, the openings may pass from non-registration through registration to non-registration, the powder being ejected during the registration period.

The device of my invention, therefore, presents a powder receptacle in which the powder is prevented from escape when the device is in closed position, the opening of the cover allowing the exit of powder and ejecting powder from the receptacle.

I do not limit myself to the particular size, shape, number or arrangement of parts as shown and described, as these are given simply as a means for clearly describing my invention.

What I claim is:—

1. In a powder container, in combination, a powder receptacle; a plurality of foraminous superimposed plates spaced from the bottom of the container, the openings of which are capable of registration and non-registration; a cover hingedly carried by the receptacle; means whereby the opening movement of the cover will cause registration of the plate openings, and means whereby the closing movement of the cover will cause non-registration of the plate openings.

2. In a powder container, in combination, a powder receptacle; a plurality of foraminous superimposed plates spaced from the bottom of the container, the openings of which are capable of registration and non-registration; a cover hingedly carried by the receptacle; means whereby the opening movement of the cover will cause registration of the plate openings and force powder from within the receptacle outwardly through the registered openings, and means whereby the closing movement of the cover will cause non-registration of the plate openings.

3. In a powder container, in combination, a powder receptacle, a fixed foraminous plate spaced from the bottom of the receptacle forming a powder space therein, a slidable foraminous plate abutting upon the fixed plate, a hinged cover for the receptacle, means whereby the opening of the cover will cause a registration of the openings of the two plates, and means whereby the closing of the cover will cause a non-registration of the openings of the two plates.

4. In a powder container, in combination, a powder receptacle, a fixed foraminous plate spaced from the bottom of the receptacle forming a powder space therein, a slidable foraminous plate abutting upon the fixed plate, a hinged cover for the receptacle, means whereby the opening of the cover will cause a registration of the openings of the two plates, means whereby the closing of the cover will cause a non-registration of the openings of the two plates, and means whereby the opening of the cover will force powder from within the receptacle outwardly through the registered openings of the two plates.

5. In a powder container, in combination, a powder receptacle; a fixed foraminous plate spaced from the bottom of the receptacle forming a powder space therein; a slidable foraminous plate abutting upon the fixed plate and having downwardly extended powder ejecting plates; a plurality of baffle-plates extending upwardly from the receptacle bottom and between the ejecting plates; a hinged cover for the receptacle, means whereby the opening of the cover will cause a registration of the openings of the two plates, moving the ejecting plates and baffles with respect to each other and forcing powder outwardly from within the receptacle; and means whereby the closing of the cover will cause non-registration of the openings of the two foraminous plates.

6. In a powder container, in combination, a powder receptacle; a plurality of foraminous superimposed plates spaced from the bottom of the container, the openings of which are capable of registration and non-registration; a cover hingedly carried by the receptacle; means whereby the opening movement of the cover will cause registration of the plate openings and force powder from within the receptacle outwardly through the registered openings, means whereby the closing movement of the cover will cause non-registration of the plate openings, means for retaining a powder compact and a mirror-carrying means.

7. In a powder container, in combination, a powder receptacle; a fixed foraminous plate spaced from the bottom of the receptacle forming a powder space therein; a slidable foraminous plate abutting upon the fixed plate and having downwardly extended powder ejecting plates; a plurality of baffle-plates extending upwardly from the receptacle bottom and between the ejecting plates; a hinged cover for the receptacle, means whereby the opening of the cover will cause a registration of the openings of the two plates, moving the ejecting plates and baffles with respect to each other and forcing powder outwardly from within the receptacle; means whereby the closing of the cover will cause non-registration of the openings of the two foraminous plates, and means for retaining a powder compact.

8. In a powder container, in combination, a powder receptacle; a fixed foraminous plate spaced from the bottom of the receptacle forming a powder space therein; a slidable foraminous plate abutting upon the fixed plate and having downwardly extended powder ejecting plates; a plurality of baffle-plates extending upwardly from the receptacle bottom and between the ejecting plates; a hinged cover for the receptacle, means whereby the opening of the cover will cause a registration of the openings of the two plates, moving the ejecting plates and baffles with respect to each other and forcing powder outwardly from within the receptacle; means whereby the closing of the cover will cause non-registration of the openings of the two foraminous plates, means within the cover for retaining a powder compact and a mirror-carrying means.

9. In a powder container, in combination, a powder receptacle; a plurality of foraminous superimposed plates spaced from the bottom of the container, the openings of which are capable of registration and non-registration; a cover hingedly carried by the receptacle; movable powder ejecting members within the receptacle and below the plates; means whereby the opening movement of the cover will cause registration of the plate openings and cause the ejecting members to force powder from within the receptacle outwardly through the registered openings; means whereby the closing movement of the cover will cause non-registration of the plate openings.

10. In a powder container, in combination, a powder receptacle; a plurality of foraminous superimposed plates spaced from the bottom of the container, the openings of which are capable of registration and non-registration; a cover hingedly carried by the receptacle; movable powder ejecting members within the receptacle and below the plates; means whereby the opening movement of the cover will cause registration of the plate openings and cause the ejecting members to force powder from within the receptacle outwardly through the registered openings; means whereby the closing movement of the cover will cause non-registration of the plate openings and return the ejecting members to their former positions.

11. The combination of a vanity case, perforated plate, a perforated top member holding the perforated plate, on the case in position over the powder, a swingable cover member, and means operatively connecting the swingable cover member with the perforated plate whereby the opening of said cover member will also operate the plate to sift powder therethrough.

12. A vanity case comprising a body, a lid hinged thereto, a deck plate in said body spaced from the bottom thereof and having a discharge opening therein, a closure member carried by said deck plate, an operating member carried by the lid whereby the swinging of the lid controls the opening and closing movements of said closure member.

13. A vanity case comprising a body, a lid hinged thereto, a pair of relatively movable plates spaced from the bottom of the box forming a loose powder compartment beneath them, said plates having registering openings therein in one of the relative positions thereof, and means controlled by the swinging of said lid for moving one of said plates relatively to the other to close said opening and prevent the escape of loose powder from said compartment.

14. A vanity-case including a body having a powder-compartment, in combination with a perforated powder plate carried by the body and reciprocably shiftable relatively to the compartment, a cover-member hinged to the body for pivotal movement and an extension upon the plate having hinged connection with the cover-member, whereby the plate is automatically shifted on hinged movement of the cover-member.

15. A vanity-case including a body having a powder-compartment, in combination with a perforated powder plate carried by the body and reciprocably shiftable relatively to the compartment, a cover-member hinged to the body for pivotal movement, an extension upon the plate having hinged connection with the cover-member, whereby the plate is automatically shifted on hinged movement of the cover-member, and means for pressing the powder contained in said compartment towards said plate.

Signed at New York city, in the county of New York, and State of New York, this 30th day of July, 1925.

HOWARD S. NEIMAN.